US005151719A

United States Patent [19]

Akutsu et al.

[11] Patent Number: 5,151,719

[45] Date of Patent: Sep. 29, 1992

[54] DEVICE FOR THERMALLY FUSING AN UNFUSED IMAGE ON AN IMAGE HOLDING MEMBER

[75] Inventors: Eiichi Akutsu; Yoshio Shoji; Hiroo Soga; Shigehito Ando, all of Kanagawa, Japan

[73] Assignee: Fuji Xerox Co, Ltd., Tokyo, Japan

[21] Appl. No.: 746,722

[22] Filed: Aug. 19, 1991

[30] Foreign Application Priority Data

Sep. 5, 1990 [JP] Japan ................................ 2-233358

[51] Int. Cl.[5] ............................................ G01D 15/06

[52] U.S. Cl. ................................ 346/160.1; 355/282; 355/285

[58] Field of Search ............... 355/282, 285, 289, 290; 219/216; 346/160.1

[56] References Cited

U.S. PATENT DOCUMENTS

| | | | |
|---|---|---|---|
| 4,434,353 | 2/1984 | Marsh et al. | 219/216 |
| 4,596,920 | 6/1986 | Inagaki | 219/216 |
| 4,791,275 | 12/1988 | Lee et al. | 219/216 |
| 4,796,046 | 1/1989 | Suzuki . | |
| 4,951,096 | 8/1990 | Derimiggio et al. | 355/285 |
| 5,051,784 | 9/1991 | Yamamoto et al. | 355/285 |
| 5,068,675 | 11/1991 | Momose | 355/285 X |

*Primary Examiner*—A. T. Grimley
*Assistant Examiner*—Sandra L. Brasé
*Attorney, Agent, or Firm*—Finnegan, Henderson, Farabow, Garrett and Dunner

[57] ABSTRACT

An image formed of a colored image forming material mainly composed of thermoplastic resin and carried by a paper sheet is heated and fused by a heating member which is typically belt-like and includes an adhesion preventive layer for preventing adhesion of the image forming material, a conductive layer formed on the adhesion preventive layer, and an electric heating layer for generating heat upon reception of electric energy. A power supply member typically has divisional electrodes arranged in the width direction of the heating member, and supplies the electric energy to the heating member. A pressurizing member is disposed opposite the heating member with the image-carrying sheet interposed therebetween, and provides a pressure acting between the divisional electrodes and the image-carrying sheet. A control circuit controls pulse currents to be supplied to the divisional electrodes through the power supply member in accordance with an image signal having been used for forming the image on the image carrying sheet.

11 Claims, 4 Drawing Sheets

DEVICE FOR THERMALLY FUSING AN UNFUSED IMAGE ON AN IMAGE HOLDING MEMBER

BACKGROUND OF THE INVENTION

The present invention relates to an image fusing device for use in an image forming apparatus such as a copier, a printer and a facsimile machine, which fuses an unfused image formed on an image holding member such as a paper sheet and a film, and, in particular, relates to an image fusing device which thermally fuses an unfused image formed of a colored image forming material consisting mainly of thermoplastic resin on an image holding member.

Conventionally, as methods for fusing an unfused image of this type, there are typically known the following methods:

(1) Heating roll fusing method: There are provided a heating roll having a heater disposed at the center thereof and a pressure roll pressable against the heating roll. An image holding member carrying an unfused image is passed between these two rolls and the heat from the heating roll and the pressure between the two rolls are used to fuse the unfused image.

However, in the heating roll fusing method, because it is necessary to heat the heating roll having a large heat capacity, the heat energy consumption is large. Also, it takes time to heat the heating roll up to its operational temperature. Especially in a cold season, it takes a long time for the heating, disabling quick start. Another problem is that an image offset to the heating roll is likely to occur.

(2) Radiant fusing method: An unfused image containing a coloring agent is heated by use of radiant heat generated from a hot wire, to be fused thermally.

However, the radiant fusing method also has the disadvantage of large energy consumption, and there exists a problem on safety. For example, there is a possibility that an image holding member such as a paper sheet and a film catches fire.

(3) Solvent fusing method: An organic solvent vapor is sprayed in a gaseous state onto an unfused image formed on an image holding member and an image forming material is dissolved and fused.

However, in the solvent fusing method, the solvent gas may leaks out to cause environmental pollution or fire. That is, the solvent fusing method has a problem in the safety management.

(4) Pressure fusing method: A relatively high pressure is applied between two rolls, and an image holding member carrying an unfused image is passed between the two rolls to thereby fuse the unfused image onto the image holding member by pressure deformation.

However, in the pressure fusing method, image forming materials usable are limited to special ones. When the image holding member is folded, a fused image may be peeled off. That is, the pressure fusing method is disadvantageous in the stability of a fused image. Further, because the image holding member is deformed and deteriorated in the process of the pressure fusing, the double-sided fusing is difficult to realize. In addition, a fusing unit becomes heavy.

As described above, the several methods for fusing an unfused image have been proposed and implemented, but none of them are perfect. That is, each of them has its own advantages and disadvantages.

Recently, image forming apparatuses of various types have experienced improvements in some aspects: the image forming speed has been increased, its performance has been improved to produce clear pictures, and the size of the apparatus has been reduced. Thus, image fusing devices used in such image forming apparatuses have also been required to be compact, high in fusing speed, low in energy consumption, and free from the image offset problem. These requirements cannot be satisfied, in some cases, by conventional image fusing devices using any of the above image fusing methods, and therefore the development of a new type of image fusing device has been called for.

SUMMARY OF THE INVENTION

The present invention has been made in view of the circumstances described above. Accordingly, an object of the invention is to provide an image fusing device which can realize low energy consumption, quick start of an image forming apparatus and high fusing speed with a compact structure.

Another object of the invention is to provide an image fusing device that can prevent stains due to an image offset, and thus is capable of using an image forming material whether it includes an offset preventive oil or not, which leads to an increased freedom of selection of usable image forming materials and also to elimination of a sub-unit for cleaning stains due to the image offset.

A further object of the invention is to provide an image fusing device that can reduce heat leakage to a very small amount, and thereby restrict a temperature increase of a whole image forming apparatus into which the image fusing device is incorporated, which leads to a reduction of the need for a heat consideration to facilitate the design of the whole image forming apparatus, and also to elimination of pollution-inducing problems such as generation of bad smell, smoke and hot air.

According to the present invention, an image fusing device for thermally fusing an unfused image formed of a colored image forming material mainly made of thermoplastic resin on an image holding member comprises:

heating means pressable against the image holding member carrying the unfused image, for heating the unfused image, said heating means including:

an adhesion preventive layer for preventing adhesion of the colored image forming material of the unfused image;

an electrically conductive layer formed on the adhesion preventive layer; and an electric heating layer formed on the electrically conductive layer for generating heat upon reception of electric energy;

power supply means including a contact electrode part disposed in a width direction of the heating means, for supplying the electric energy to the heating means; and pressurizing means disposed opposite the heating means with the image holding member interposed therebetween, for providing a pressure contact between the contact electrode part of the power supply means and the heating means and between the heating means and the image holding member.

With the above construction, electric energy is supplied to the heating means, which includes the adhesion preventive layer, electrically conductive layer and electric heating layer, to generate heat in a position adjacent to an unfused image to heat it directly and efficiently.

DESCRIPTION OF THE PREFERRED EMBODIMENTS

Embodiments of the present invention will be described below with reference to the accompanying drawings.

FIGS. 1-4 show an image fusing device according to an embodiment of the invention. The image fusing device includes a heating means 1 formed in an endless belt shape, which is pressed from above against a paper sheet P (image holding member) carrying an unfused image $A_1$, and heats the unfused images $A_1$; a power supply means 2 which includes a contact electrode part 7 (see FIGS. 3 and 4) disposed along the width direction of the heating means 1, and supplies electric energy to the heating means 1; and a pressurizing roll 3 (pressurizing means) which is disposed under the heating means 1 and on the opposite side of the sheet P, and is pressed from below against the sheet P in link with the heating means 1.

Figure 2:
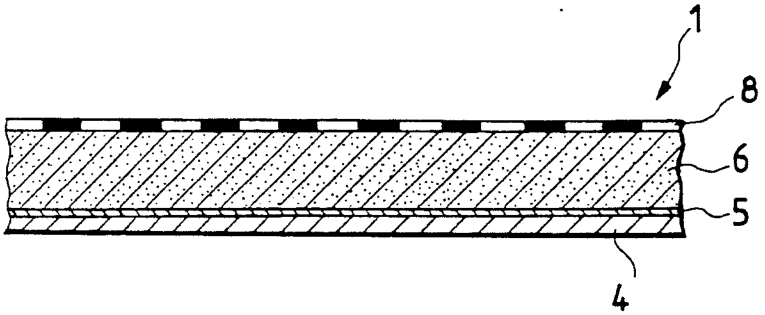
FIG. 2 is a sectional view showing part of a heating means used in the device of FIG. 1.

As shown in FIG. 2, the heating means 1 comprises an adhesion preventive layer 4 for preventing adhesion of a toner (colored image forming material) of the unfused image $A_1$, an electrically conductive layer 5 formed on the adhesion preventive layer 4, and an electric heating layer 6 formed on the electrically conductive layer 5, for generating heat in response to the reception of electric energy from the power supply means 2. The heating means 1 further includes, on the upper surface of the electric heating layer 6, a contact resistance suppression layer 8 which is highly wear-proof and has a good electric conductivity in its thickness direction and a high resistivity in its surface directions.

The electric heating layer 6 of the heating means 1 is composed of a 50-μm-thick, conductive polyimide film including 39 wt % of conductive carbon black. A checkered contact resistance suppression layer 8 is formed by first depositing a nickel film of 2.5 μm in thickness on the entire surface of the electric heating layer 6, subjecting the deposited nickel film to a photolithography process of 105 $\mu m^2$ and a pitch of 125 μm, and thereafter performing etching. On the other surface of the electric heating layer 6 opposite to the contact resistance suppression layer 8, an aluminum film of 1,200 Å in thickness is coated with a substrate temperature of 150° C. by vacuum vapor deposition to form the electrically conductive layer 5. The adhesion preventive layer 4 having a thickness of 5 μm and a critical surface tension of 19 dyne/cm is formed by coating a coating solution obtained by dispersing 10 wt % carbon into polydifluoroethylene on the electrically conductive layer 5, and dry-welding the coated solution to the conductive layer 5 at 300° C.

Figure 1:
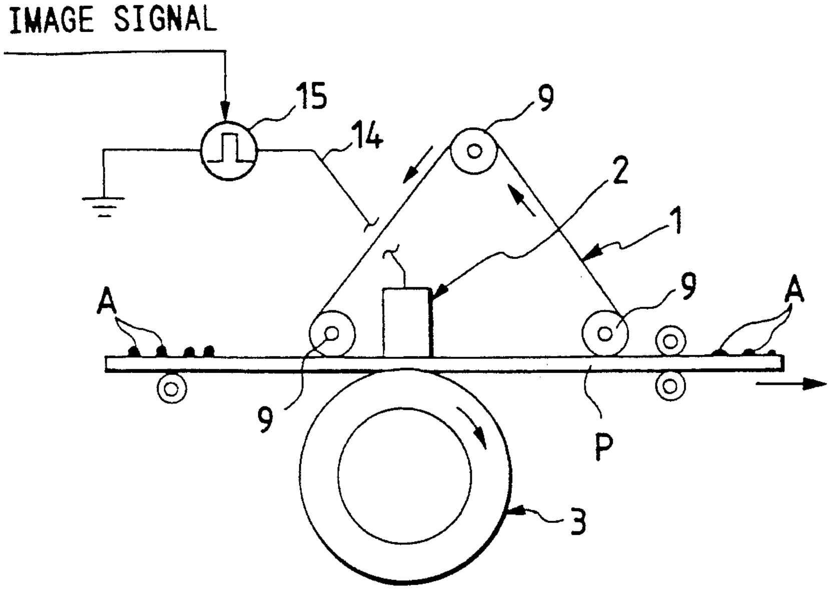
FIG. 1 is a schematic diagram showing an image fusing device according to an embodiment of the invention.

The endless-belt-shaped heating means 1 thus formed is wound around, for example, 3 rollers 9, as shown in FIG. 1.

Figure 3:
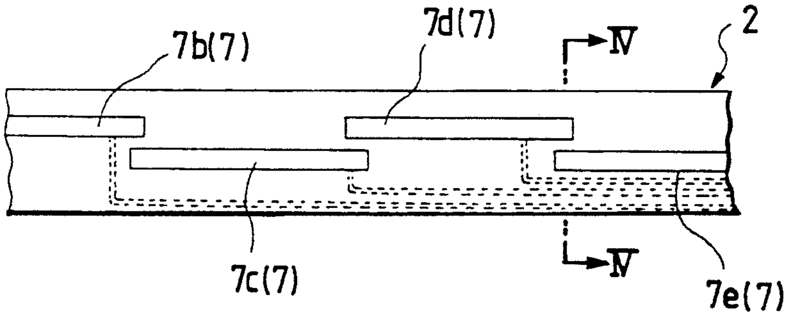
FIG. 3 is a plan view showing a power supply means used in the device of FIG. 1.
Figure 4:
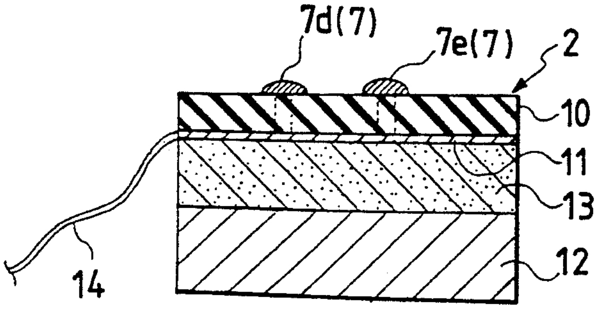
FIG. 4 is a sectional view taken along the line IV—IV in FIG. 3.

As shown in FIGS. 3 and 4, the contact electrode part 7 of the power supply means 2 is composed of eight divisional electrodes 7*a*, 7*b*, . . . , 7*h* (also see FIG. 5) each having a width of 100 μm and a length of 30 mm. These divisional electrodes 7*a*, 7*b*, . . . , 7*h* are placed on one surface of an insulation layer 10 formed of a polyimide film having a thickness of 75 μm, and are projected out by about 10-50 μm from the insulation layer 10. On the other side of the insulation layer 10, there are formed a patterned electrode circuit 11 for supplying controlled electric energy to the respective divisional electrodes 7*a*, 7*b*, . . . , 7*h*, a rigid layer 12 for providing a pressure to press the divisional electrodes 7*a*, 7*b*, . . . , 7*h* against the heating means 1, and an elastic layer 13 interposed between the rigid layer 12 and the insulation layer 10 and patterned electrode circuit 11, for absorbing variations of the contact pressure of the divisional electrodes 7*a*, 7*b*, . . . , 7*h* to the heating means 1. The divisional electrodes 7*a*, 7*b*, . . . , 7*h* are disposed in a zigzag manner on the surface of the insulation layer 10 and adjoining ones of the divisional electrodes 7*a*, 7*b*, . . . , 7*h* are overlapped with each other in a non-contact manner, so that at least one of the divisional electrodes 7*a*, 7*b*, . . . , 7*h* exists at any point of the entire length of the contact electrode part 7. As shown in FIG. 1, the patterned electrode circuit 11 is connected to an input pulse generator 15 by means of a lead wire 14.

Figure 5:
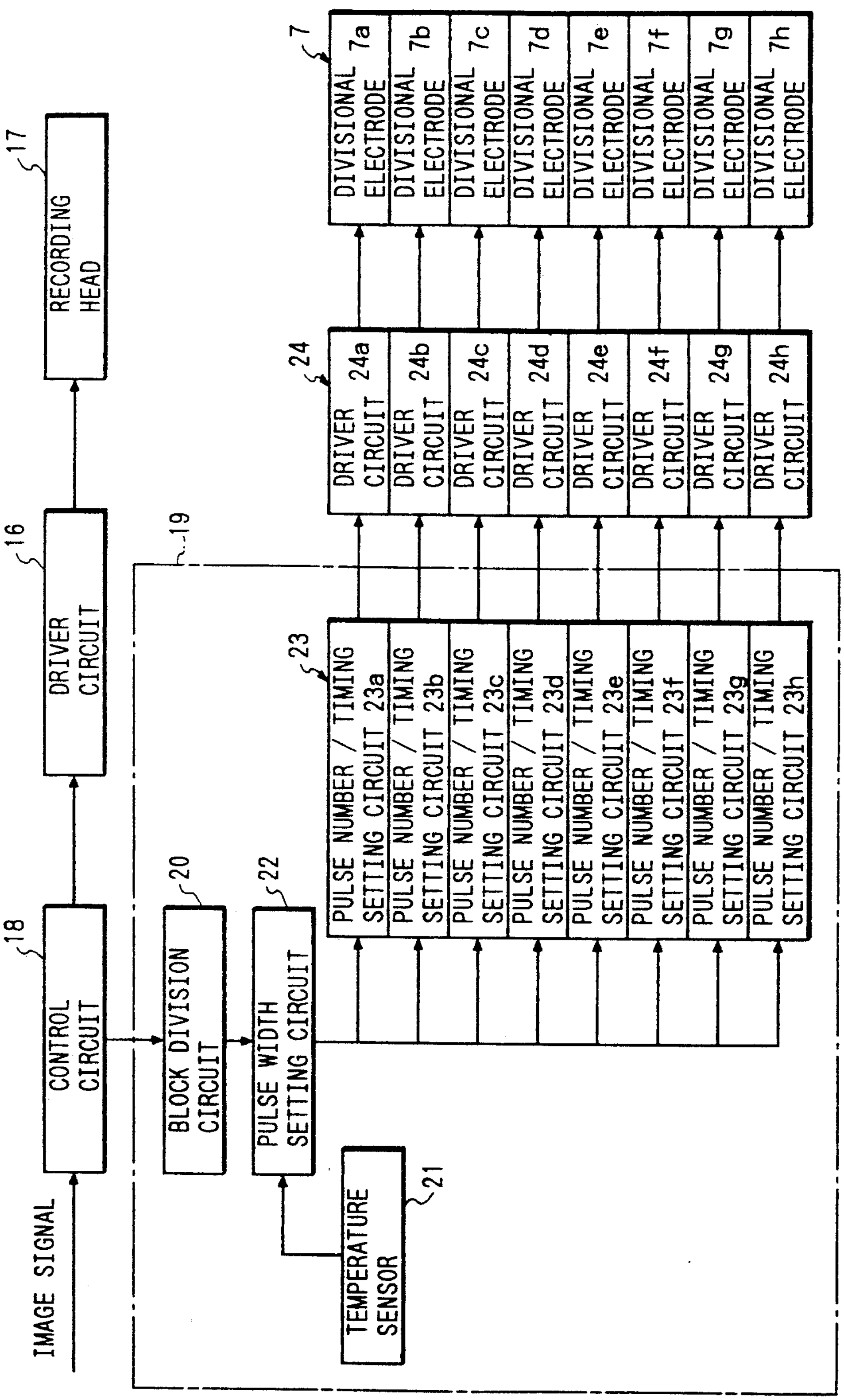
FIG. 5 is a block diagram showing a control means incorporated in a pulse generator used in the device of FIG. 1.

As shown in FIG. 5, the input pulse generator 15 includes a control means 19 for taking out an image signal which is to be supplied through a driver circuit 16 to a recording head 17, from a control circuit 18 for converting the image signal to a signal suitable for the recording head 17. The control means 19 controls pulse currents to be supplied to the respective divisional electrodes 7*a*, 7*b*, . . . , 7*h* of the power supply means 2 in accordance with the image signal thus taken out. For example, the recording head 17 includes a known laser oscillator and emits a laser beam in accordance with the image signal. A photoreceptor provided upstream of the fusing device is irradiated by this laser beam. A toner image is then developed and transferred onto the sheet P, to form the unfused image $A_1$ which is in accordance with the image signal.

The control means 19 comprises a block division circuit 20 for dividing the image signal taken out from the control circuit 18 to conform to the divisional electrodes 7*a*, 7*b*, . . . , 7*h* of the contact electrode part 7, a pulse width setting circuit 22 which, receiving the divided image signals from the block division circuit 20 and a temperature detection signal from a environment temperature sensor 21, sets the pulse width such that it becomes wide when the environment temperature is low and narrow when the environment temperature is high, to thereby set the electric energy to be supplied to the respective divisional electrodes 7*a*, 7*b*, . . . , 7*h*, and pulse number/timing setting circuits 23*a*, 23*b*, . . . , 23*h* for setting the pulse numbers and the output timings of the pulse currents to be supplied to the respective divisional electrodes 7*a*, 7*b*, . . . , 7*h*. The pulse currents are provided from the pulse number/timing setting circuits 23*a*, 23*b*, . . . , 23*h* through respective driver circuits 24*a*, 24*b*, . . . , 24*h* to the respective divisional electrodes 7*a*, 7*b*, . . . , 7*h*, and finally output therefrom with predetermined amplitudes and numbers at predetermined timings. The pulse number/timing setting circuits 23*a*, 23*b*, . . . , 23*h* suspend the output of the pulse currents from the time when the image signal is taken out from the control circuit 18 to the time when the portion of the sheet P carrying the unfused image $A_1$ corresponding to the taken-out image signal reaches the fusing device.

Figure 6A:
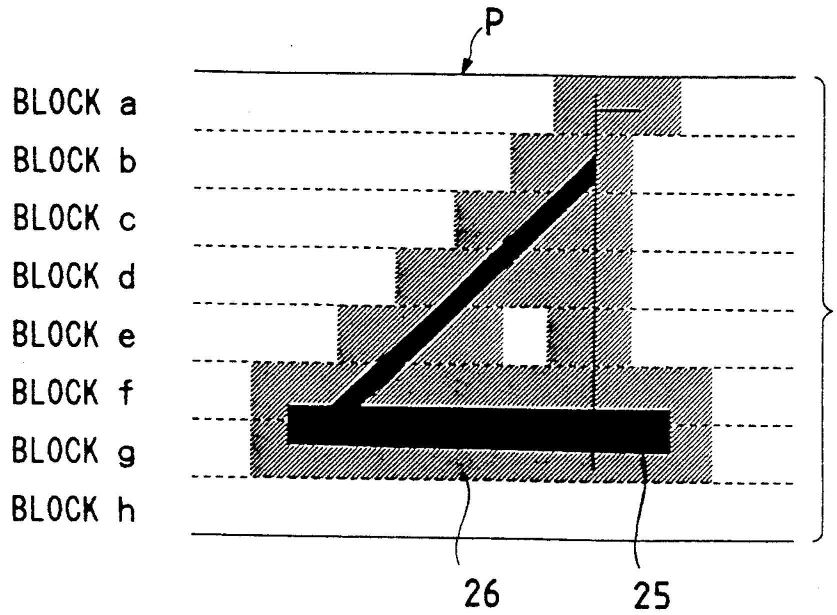
FIG. 6(*a*)-6(*c*) show how the power supply means is controlled by the control means.
Figure 6B:
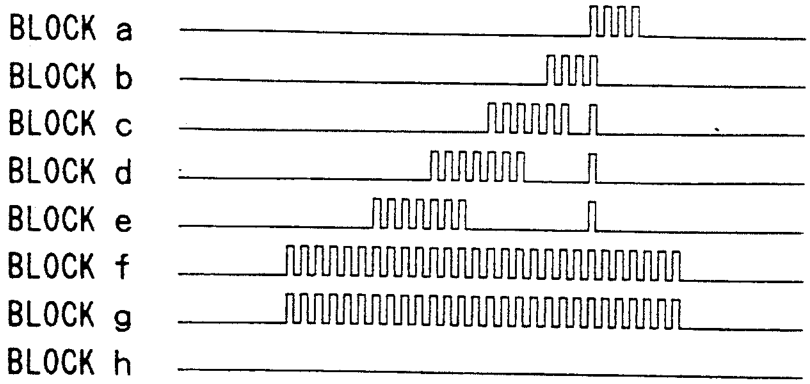
Figure 6C:
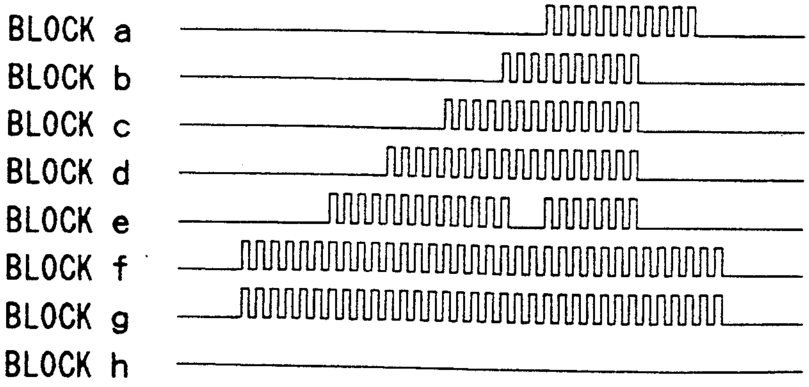

As shown in FIGS. 6(*a*)-6(*c*), the following operation is preferred. If at least one "ON signal" is present for recording elements of one line, i.e., in corresponding ones of blocks a, b, c, d, e, f, g, and h divided by the block division circuit 20, the output of the pulse currents to the selected ones of the divisional electrodes 7*a*, 7*b*, . . . , 7*h* corresponding to the ON-signal blocks is advanced slightly, preferably by a period of 0.2 mm/(print linear velocity) before the portion of the unfused image $A_1$ which corresponds to the ON signal passes the fusing position. The output of the pulse currents is continued up to the time delayed slightly, preferably by a period of 0.1 mm/(print linear velocity) after the portion of the unfused image $A_1$ passes the fusing position. In this manner, the pulse currents are output during the period starting from a time slightly before the unfused image $A_1$ corresponding to the ON signal passes the fusing position and ending at a time slightly thereafter, providing an advantageous effect of ink smoothing due to superposed heating.

In FIG. 6(*a*), reference numeral 25 designates a fusing area of an image $A_2$ to be fused on the sheet P, and 26 stands for a heating area on the sheet P to be heated by the heating means 1. FIG. 6(*b*) shows a pattern of print pulses to be supplied to the recording head, and FIG. 6(*c*) shows a pattern of the pulse currents to be supplied to the respective divisional electrodes 7*a*, 7*b*, . . . , 7*h*.

Further, in the embodiment, the pressurizing roll 3 is a rubber roll which is produced by winding a silicone rubber having rubber hardness of 50 and a thickness of 7 mm around a stainless steel (SUS) shaft of 20 mm in diameter.

A fusing experiment was performed using a test machine which was prepared by incorporating the image fusing device of the above embodiment into a copier of Fuji Xerox Co., Ltd. A toner made of a polyester resin and a coloring material was used as a colored image forming material. Fusing conditions: fusing pressure, 400 g/cm; fusing temperature, 125° C., sheet moving speed, 50 cm/sec.; and pressurizing width of the fusing part, 6 mm.

After the fusing, an eraser rubbing test was conducted twenty times under the pressure of 500 g/cm$^2$ on the sheet P having the fused image $A_2$ obtained from the above fusing experiment. Resultant image density variations were measured by use of a micro densitometer. This test showed that the image density variations were within the optical image density range of $\pm 0.2$ of the initial image density, which means there occurred no image deterioration. Further, a copying endurance experiment was carried out using the same test machine with a paper consumption corresponding to 50,000 sheets of A4 paper. There appeared no specific change in fusing performance.

Another copying endurance experiment of A4 50,000 sheets was conducted in the same manner using a test machine which is the same as the above one except that the heating means 1 did not employ the contact resistance suppression layer 8. While the initial endurance performance up to the paper consumption corresponding to 5,000 sheets of A4 paper was the same as the above experiment, in subsequent copying after 5,000 sheets there occurred insufficient fusing portions in part of copied sheets. This shows that the use of the contact resistance suppression layer 8 in the image fusing device of the above embodiment is effective. In other words, the use of the contact resistance suppression layer 8 is advantageous when the image fusing device should be of a long life type, while in the case of the image fusing device of a short life type sufficient performance can be obtained even without the contact resistance suppression layer 8.

Figure 7:
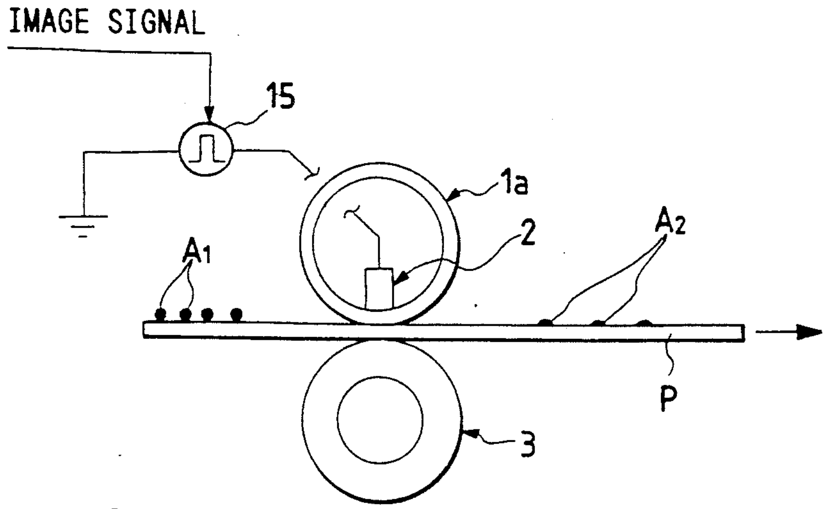
FIGS. 7-9 shows respective modifications of the heating means.
Figure 8:
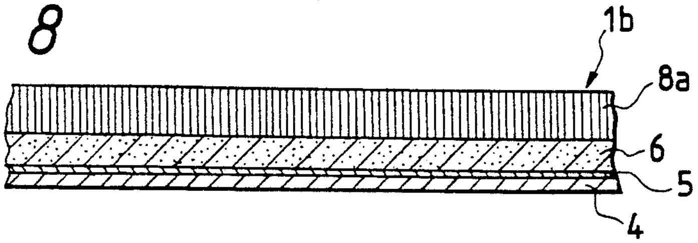
Figure 9:
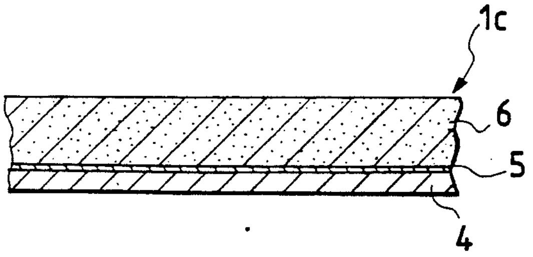

FIGS. 7-9 show modifications of the heating means 1, respectively. More specifically, in FIG. 7 a heating means 1*a* is constructed in the shape of a rigid drum. In FIG. 8, a contact resistance suppression layer 8*a* of the heating means 1*b* is formed of an anisotropic conductive material having a conductor pattern. In FIG. 9, no contact resistance suppression layer is used in a heating means 1*c*.

Figure 10:
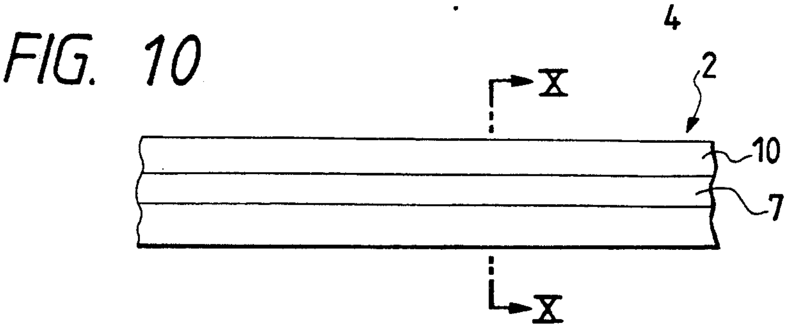
FIGS. 10 and 11 show a modification of the power supply means.
Figure 11:
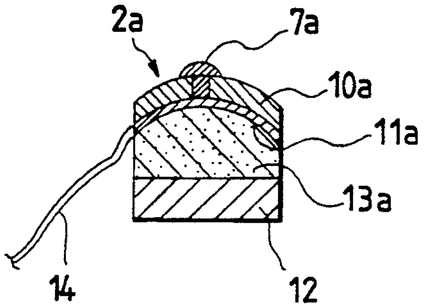

FIGS. 10 and 11 show a modification of the power supply means 2. Unlike the power supply means 2 of the above embodiment, a contact electrode part 7*a* is a single electrode which is continuous over its entire length, the surface of an elastic layer 13*a* is formed into an arc shape, and a patterned electrode circuit 11*a* and an insulation layer 10*a* laid on the elastic layer 13*a* are also formed into an arc shape. As a result, the pressure provided from the rigid part 12 can be concentrated on the contact electrode part 7*a*, and thus the contact electrode part 7*a* can be brought into positive contact with the sheet P carrying the unfused image $A_1$ with a small pressurizing force.

According to the present invention, as described in the embodiment and modifications, the heating means is normally formed in a flexible belt shape or in a rigid drum shape, and includes at least the adhesion preventive layer, electrically conductive layer and electric heating layer. The adhesion preventive layer is the outermost layer of the heating means, and is directly pressed from above against the image holding member carrying an unfused image. The adhesion preventive layer may be formed of fluoride resin, silicone resin, a derivative thereof, a mixture thereof, a compound thereof or a modified resin thereof. The thickness of the adhesion preventive layer should be 0.05-7 $\mu$m, preferably in the range of 0.1-1 $\mu$m, the critical surface tension 30 dyne/cm or less, and the heat resistance 170° C. or more. The electrically conductive layer, which is formed on the adhesion preventive layer, may be made of a metal material such as copper and silver, an electrically conductive ceramic material, an electrically conductive particle dispersed material. The conductive layer should have a volume resistivity of 5 Ωcm or less, preferably $10^{-3}$ Ωcm or less. Further, the electric heating layer laid on the conductive layer may be made of an electrically conductive resin film produced by dispersing an electrically conductive filler such as carbon black, metal powder and electrically conductive ceramic powder into a synthetic resin such as polyimide, polyaramide, polyimideamide, fluororesin, or may be made of an electrically conductive ceramic sheet. The electric heating layer normally should have a thickness of 0.3-150 $\mu$m and a volume resistivity of $10^{-2}-10^{2}$ Ωcm.

In order to improve the supply efficiency of electric energy from the power supply means and the durability of the electric heating layer, it is preferred that the heating means include, on the upper surface of the electric heating layer to be pressed by the power supply means, the contact resistance suppression layer which has a good wear resistance, and a high electric conductivity in its thickness direction and a high resistance in its surface directions. Such a contact resistance suppression layer should have a resistivity in the thickness direction of $10^{31\ 1}$ Ω/mm$^2$ or less, preferably $5\times10^{-2}$ Ω/mm$^2$ or less, and a resistivity in the surface directions of 100 Ω/□ or more in the 4-probe resistance measurement (probe pitch, 2 mm), preferably 1 kΩ/□ or more. In particular, it is preferred that the contact resistance suppression layer be electrically discontinuous in its longitudinal direction. The structure of the contact resistance suppression layer is not limited specifically, but it may be constructed in various manners. For example, it may be constructed by forming a thin film of metal such as nickel, copper, chromium, gold, rhodium and tungsten on the upper surface of the electric heating layer, and performing a photolithography/etching treatment on the metal thin film to thereby form in the surface directions an isolated pattern such as polka dots and a checkered pattern having smaller conductive areas, to provide discontinuous conductive areas. Alternatively, the contact resistance suppression layer may be formed of an insulating material and a plurality of electrically conductive needle-shaped members, with the needle-shaped members being highly densely put into the insulating material in its thickness direction. As another alternative, the contact resistance suppression layer may be made of a plurality of materials different in electric conductivity, for example, made by dispersing electrically conductive particles. In order to prevent loss of electric energy supplied from the contact electrode part of the power supply means, the contact resistance suppression layer should preferably be arranged such that the pitch of the conductive areas of the suppression layer in its longitudinal direction is smaller than the width of the contact electrode part of the power supply means, preferably, 10 mm or less. More preferably, the pitch of the conductive areas should correspond to the pixel pitch of a recording image.

Referring now to the power supply means, any supply means can be employed, provided that it can supply electric energy properly to the heating means. Preferably, the power supply means should include, in addition to the contact electrode part, the insulating layer for supporting the contact electrode part, the patterned electrode circuit for supplying controlled electric energy to the contact electrode part, the rigid layer for generating a pressure to press the contact electrode part against the heating means, and the elastic layer disposed between the rigid layer and insulating layer to absorb the contact pressure of the contact electrode part with respect to the heating means. The shape of the contact electrode part may be belt-like or bar-like, that is, it is not limited to any special shape but may be constructed in various ways, provided that it is able to contact with the electric heating layer of the heating means over its entire width. Preferably, however, the contact electrode part should be composed of a plurality of divisional electrodes divided along the width direction of the electric heating layer. When the contact electrode part is composed of a plurality of divisional electrodes, the number of the divisional electrodes is not limited to any specific one. However, if the part is divided into too many electrodes, then problems arises in manufacture such as wiring. On the other hand, if it is divided into too few electrodes, then the electrode division itself will not be meaningful. In view of these facts, the number of the divisional electrodes may normally be selected to 3–40, preferably 6–20. The divisional electrodes may be arranged in a zigzag manner, for example. Preferably, the adjoining electrodes may be overlapped with each other in a non-contact manner, so that at least one divisional electrode exists at any point of the whole length of the contact electrode part.

The control means may be provided to control the electric energy to be supplied from the contact electrode part of the power supply means to the heating means in accordance with the image signal so that the electric heating layer generates heat according to the portion and/or density of the unfused image formed on the image holding member. In particular, if the contact electrode part of the power supply means is composed of a plurality of divisional electrodes divided along the width direction of the heating means, and if the amount of the electric energy to be supplied to the respective divisional electrodes is controlled in accordance with the image signal, the energy consumption can be reduced efficiently.

For this purpose, any type of control means can be used, provided that it can take out the image signal to be supplied to the recording head when a latent electrostatic image is written into a latent electrostatic image carrier in an image forming apparatus, and also can control the amount of electric energy to be supplied from the contact electrode part to the heating means in accordance with this image signal. Preferably, however, when the contact electrode part is composed of a plurality of divisional electrodes, the control means should include the block division circuit for dividing the image signal into blocks corresponding to the divisional electrodes, the setting circuit for detecting the image signals from the block division circuit and an environment temperature and setting the amount of electric energy to be supplied to the respective divisional electrodes (when the electric energy is supplied in the form of a pulse current, the pulse width setting circuit, the pulse number/timing setting circuit, etc.), and the driver circuit for generating electric energy for the heating in accordance with output signals from the setting circuit. The electric energy to be supplied from the power supply means to the heating means may be carried by any type of current such as a direct current and an alternating current, provided that it enables the heating means to generate heat. In particular, when the control means is used to control the amount of electric energy to be supplied to the heating means, it is preferred that the electric energy be supplied in the form of a pulse current because it is easy to control.

Further, the pressurizing means is arranged such as to be opposed to the heating means with the image holding member carrying the unfused image interposed therebetween to enable the heating means to be pressed against the image holding member from above. That is, the pressurizing means may be constructed in any shape, e.g., a hollow roll shape and a hollow block shape, provided that it can realize the above pressurized contact. The pressurizing means may be made of metal, plastic, ceramic, etc. Further, the pressurizing means may include an elastic coated layer to secure a uniform contact of the power supply means. If there exists a possibility that it is pressed against a fused image, for example, in the case of double-sided copying, the pressurizing means may include on its surface a fused image adhesion preventive layer made of a material similar to the adhesion preventive layer of the heating means.

A contact pressure created by the pressurizing means and acting between the contact electrode part of the power supply means and the image holding member, as a line pressure, should be 80–1,200 g/cm, preferably 150–400 g/cm. If the contact pressure is lower than 80 g/cm, the contact resistance of the contact electrode part becomes high. As a result, the initial heat generation becomes insufficient, and inferior fusing will be caused. On the other hand, if the contact pressure is higher than 1,200 g/cm, then the contact electrode part will be worn and thus deteriorated to a great extent.

The image fusing device of the present invention can be employed in image forming apparatuses that uses any types of colored image forming materials, provided that the unfused image formed on the image holding member is made of a colored image forming material consisting mainly of thermoplastic resin, for example, a combination of a coloring material or the like and polyester resin, styrene resin, acrylic resin, polyethylene resin, a mixture of two or more of these resins, a copolymer of these resins, or a derivative of these resins, and that the unfused image can be thermally fused.

The image fusing device of the invention can provide the following advantages. The energy consumption is reduced and, at the same time, quick start of an image forming apparatus is possible. The fusing is speeded up, and a more compact device is realized. Further, stains due to an image offset is prevented. Thanks to this, it is possible to use either of image forming materials including and excluding oil, which expands the freedom of selection of usable image forming materials, and which also eliminates the need for providing a sub-unit to clean stains caused by the image offset. Further, since the heat leakage is very little, the temperature rise of the whole image forming apparatus into which the image fusing device is incorporated is decreased. This can reduce the need for consideration of heat, which facilitates the design of the whole apparatus. In addition, the device is free from pollution-inducing problems such as generation of bad smell, smoke and hot air.

What is claimed is:

1. An image fusing device for thermally fusing an unfused image formed of a colored image forming material mainly made of thermoplastic resin on an image holding member, said image fusing device comprising:

heating means pressable against the image holding member carrying the unfused image, for heating the unfused image;

power supply means, including a contact electrode part disposed in a width direction of the heating means, for supplying electric energy to the heating means, said contact electrode part including a plurality of divisional electrodes divided in the width direction of the heating means;

control means connected to the power supply means, for controlling the amounts of the electric energies to be supplied to the plurality of divisional electrodes, respectively, in accordance with an image signal used for forming the unfused image on the image holding member; and pressurizing means disposed opposite the heating means with the image holding member interposed therebetween, for providing a pressure contact between the contact electrode part of the power supply means and the image holding member.

2. The device according to claim 1, wherein said heating means includes:

an adhesion preventive layer for preventing adhesion of the colored image forming material of the unfused image;

an electrically conductive layer formed on the adhesion preventive layer; and an electric heating layer formed on the electrically conductive layer for generating heat upon reception of electric energy.

3. The device according to claim 2, wherein the heating means further includes on the electric heating layer a contact resistance suppression layer which has a sufficient wear resistance, and is conductive in its thickness direction and resistive in its surface directions.

4. The device according to claim 1, wherein the heating means is formed in a flexible belt shape.

5. The device according to claim 1, wherein the heating means is formed in a rigid drum shape.

6. The device according to claim 1, wherein the control means control the amounts of the electric energies further in accordance with an environment temperature.

7. The device according to claim 1, wherein the plurality of divisional electrodes are arranged in a zigzag manner.

8. The device according to claim 1, wherein the electric energy is supplied from the power supply means to the heating means in the form of a pulse current.

9. An image fusing device for use in an image forming apparatus, comprising:

heating means for heating an unfused image formed on a sheet; and control means, receiving an image signal to be provided to a recording head for forming the unfused image, for controlling, in accordance with the received image signal, the heating means so that the heating means only heats a portion of the sheet which portion includes the unfused image.

10. The device according to claim 9, wherein the heating means includes a plurality of divisional electrodes which are divided in a width direction of the sheet.

11. The device according to claim 9, wherein the portion of the sheet further includes an area in the vicinity of the unfused image.

* * * * *